United States Patent [19]

Lehrman

[11] Patent Number: 5,472,157
[45] Date of Patent: Dec. 5, 1995

[54] COMBINATION ELECTRICAL CORD SUPPORT AND ARTICLE HOLDER

[76] Inventor: David Lehrman, 207 Barclay Cir., Cheltenham, Pa. 19102

[21] Appl. No.: 180,726

[22] Filed: Jan. 13, 1994

[51] Int. Cl.⁶ ................................................. F16L 3/00
[52] U.S. Cl. .................... 248/51; 38/104; 248/311.2; 439/574; 439/577
[58] Field of Search ............. 248/51, 52, 311.2, 248/314; 38/104; 439/574, 577; 220/737

[56] References Cited

U.S. PATENT DOCUMENTS

| | | |
|---|---|---|
| 1,476,395 | 12/1923 | Davis. |
| 2,144,272 | 1/1939 | Ray .................................. 248/51 |
| 2,462,464 | 2/1949 | Brier et al. ........................ 248/51 |
| 2,546,589 | 3/1951 | Felts ................................... 248/51 |
| 2,676,775 | 4/1954 | Schulz ................................ 248/51 |
| 2,715,002 | 8/1955 | Davis ................................. 248/51 |
| 2,716,531 | 8/1955 | Johnson ............................. 248/51 |
| 3,250,030 | 5/1966 | LaPastora ...................... 248/51 X |
| 3,568,970 | 3/1971 | Mallett ........................... 248/311.2 |
| 3,913,878 | 10/1975 | Wayne .......................... 38/104 X |
| 4,154,010 | 5/1979 | Evans ........................ 248/311.2 X |
| 4,535,921 | 8/1985 | Sanders ..................... 248/311.2 X |
| 4,875,878 | 10/1989 | Meyer .......................... 439/577 X |

Primary Examiner—Ramon O. Ramirez
Attorney, Agent, or Firm—Seidel Gonda Lavorgna & Monaco

[57] ABSTRACT

An apparatus mounts on an ironing board for guiding a cord of an iron and providing a holder for an article. The article has a clamp section for releasably securing the apparatus to the ironing board. A cord support is pivotably attached to the clamp for supporting the electrical cord of the electrical appliance above the ironing board. An article holder is mounted to the clamp for holding an article. An electrical receptacle is carried by the clamp for receiving a plug of the electrical cord of the iron.

14 Claims, 2 Drawing Sheets

COMBINATION ELECTRICAL CORD SUPPORT AND ARTICLE HOLDER

FIELD OF THE INVENTION

This invention relates to a combination electrical cord support for supporting an electrical cord of an electrical appliance and a holder for holding an article. The invention is particularly useful, but not limited, to an attachment for an ironing board for supporting the electrical cord of an electric iron above an ironing surface and for holding an article, such as a spray starch can or a beverage container.

BACKGROUND OF THE INVENTION

It is known to have cord support devices for supporting the electrical cord of an electric iron so that the cord will not interfere with the clothes being ironed. It is further known to incorporate on cord support devices an outlet for receiving the plug at the end of the electrical cord which is supported by the cord support device. U.S. Pat. Nos. 2,478,498 and 2,715,002 disclose such apparatus.

Frequently, an ironer wishes to have things like spray starch or other clothing treatments at hand while ironing. This means that it is frequently necessary to place such articles on the ironing board, which interferes with ironing, or to place them on a nearby surface, which is not convenient. In the case of a beverage container or other open container, the container could tip or fall spilling the contents on the ironing board or floor.

It is desired to have an apparatus for supporting the electrical cord and also for storing an article, such as spray starch can or beverage container.

It is further desired that a portion of the apparatus, such as an article holder, be removable from the ironing board when not in use in order to facilitate storage.

SUMMARY OF THE INVENTION

This invention relates to an apparatus mounted on an ironing board for guiding a cord of an iron and providing a holder for an article. The article has a clamp section for releasably securing the apparatus to the ironing board. A flexible cord support is pivotably attached to the clamp for supporting the electrical cord of the electrical appliance above the ironing board. An article holder is mounted to the clamp for holding an article. An electrical receptacle is carried by the clamp for receiving a plug of the electrical cord of the iron.

In a preferred embodiment, the clamp is "C" shaped and has a pair of leg portions extending from an end portion. One leg portion is adapted for engaging the ironing surface of the ironing board. The other leg portion is located below the underside of the ironing surface, an adjusting screw is threadedly journaled in a threaded bolt in the other leg portion. A movable jaw at an end of the adjusting screw located between the leg portions engages the underside of the ironing board for securing the apparatus to the ironing board. The flexible cord support has a first rod, a second rod and a resilient spring section. The first rod has a cord receiving end for receiving the cord. The resilient spring section is secured to a lower end of the first rod. The second rod has an upper end for detachably receiving the resilient spring section. A lower end of the second rod has a foot pivotably received by an opening defined by a brace and the upper leg portion of the clamp for permitting movement of the cord support between a raised position and a retracted position. A locking tab on the foot of the rod is releasably retained by a detent on the brace. The locking tab is engaged with and disengaged from the detent by sliding the foot relative to the brace. Engaging the locking tab with the detent retains the cord support in the raised position. The article holder has a pair of tangs detachably received by openings in a mounting brace mounted to the clamp.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
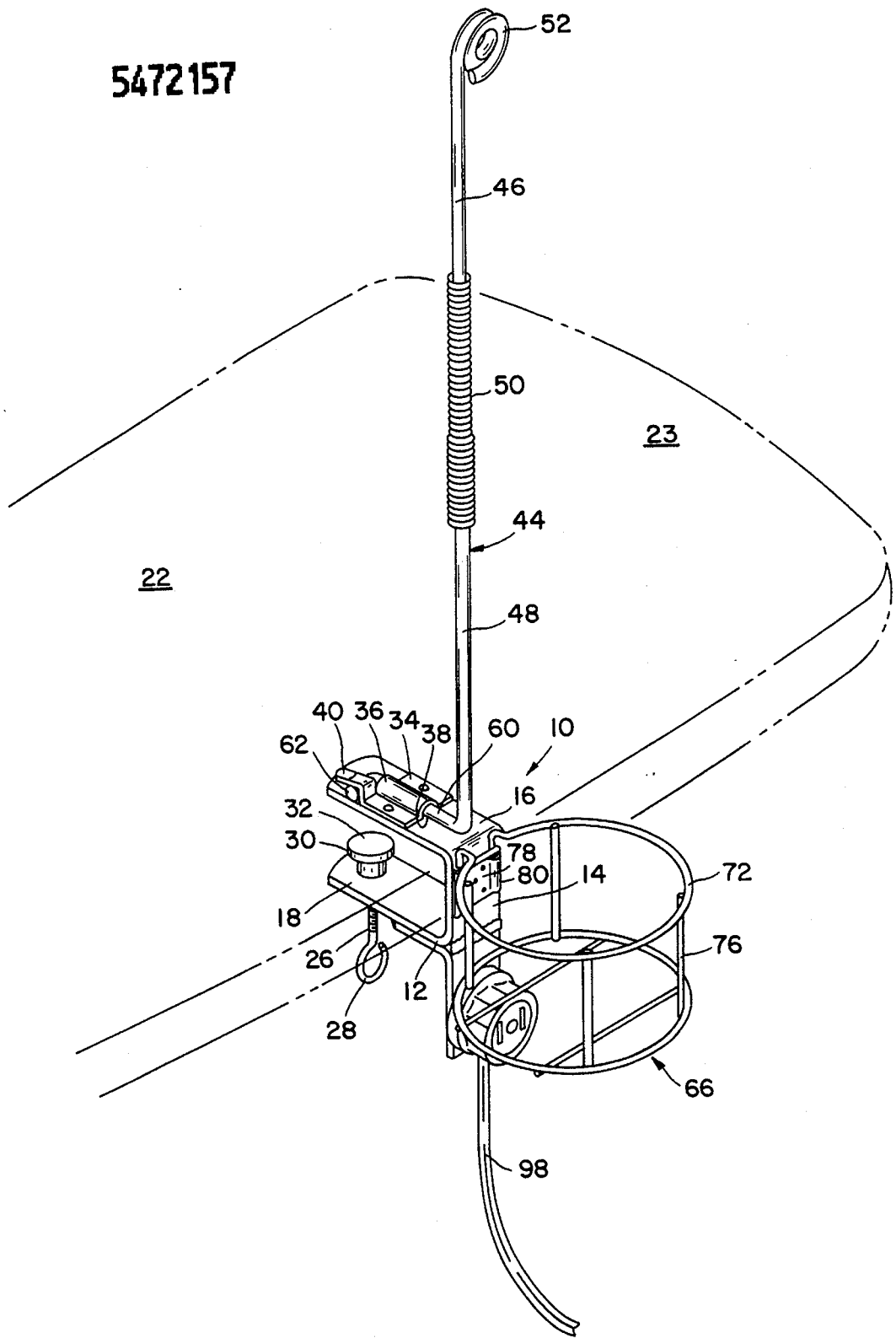
FIG. 1 is a perspective view of the invention, with the cord support in an installed raised position, and with the ironing board shown in phantom.

Referring now to the drawings, wherein like numerals indicate like elements, there is illustrated an apparatus in accordance with the present invention. The apparatus 10 comprises a releasable clamp 12 for releasably securing the apparatus to a work surface, a flexible cord support 44 and a detachable article holder 66 which can be selectably attached to and detached from the apparatus.

In a preferred embodiment, the releasable clamp is a "C" shaped clamp 12 having an end portion 14 from which extend an upper leg portion 16 and lower leg portion 18. It is recognized that the releasable clamp means could also be a squeeze or friction clamp or other securing device. The end portion 14 and upper leg portion 16 and lower leg portion 18 of the clamp 12 define a bight or opening between them. The clamp 12 receives an ironing board 22, shown in phantom, in the bight between the leg portions 16 and 18. The upper leg portion 16 engages an ironing surface 23 of the ironing board 22. The lower leg portion 18 has a threaded hole, not shown, which receives an adjustment screw such as a threaded eye bolt 26. The eye bolt 26 has an eye portion 28 at one end to facilitate the rotation of bolt 26 by the thumb and fingers. A movable clamp jaw in the form of a plastic cap 30 is located on the other end of the threaded bolt 26 between leg portions 16 and 18 and has a flat surface 32 for engaging the underside of the ironing board 22. The apparatus 10 is thus clamped to the ironing board 22 by sandwiching the ironing board between the upper leg portion 16 and the plastic cap 30.

The clamp 12 includes a retainer for retaining the flexible cord support 44 on clamp 12. The support may be integral with the clamp 12 or may comprise a separate brace 34 mounted to the upper leg portion 16 of the clamp 12, as shown. The brace 34 has a "U" shaped bend 36 and is secured to the upper leg portion 16 of the clamp 12, such as by rivets on either side of the "U" shaped bend 36. The upper leg portion 16 and the "U" shaped bend 36 of the brace 34 define an opening 38 which receives the cord support 44. The brace 34 has a detent such as a "L" shaped tab 40 projecting upward from the upper leg 16.

Figure 2:
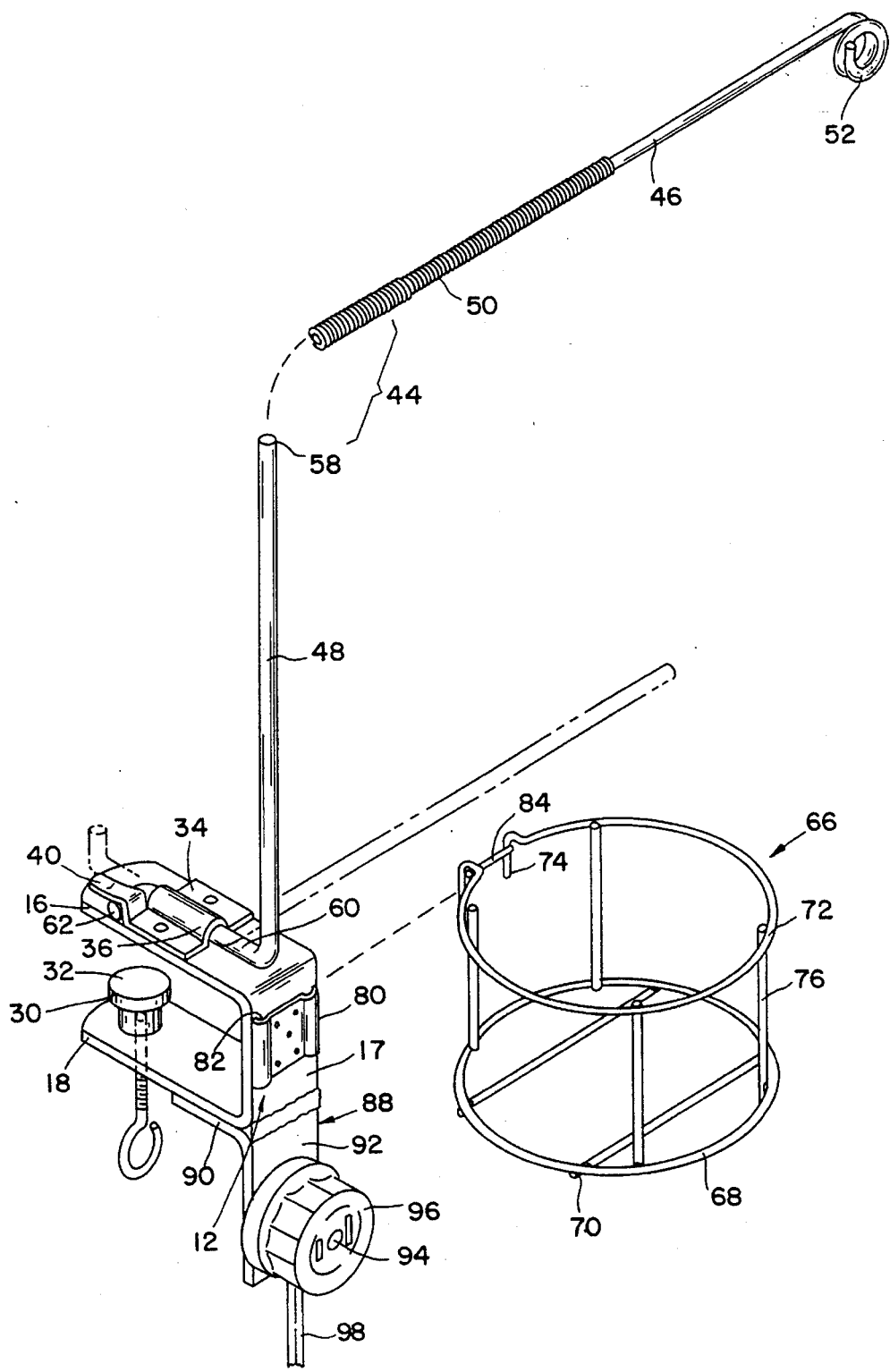
FIG. 2 is an enlarged view of the invention partially disassembled for storage, with the lower portion of the cord support shown in its retracted position in phantom.

The cord support 44 is in the form of a flexible mast and has a foot portion 60 at one end, a cord receiving portion 52 at the other end to receive the electrical cord, and a flexible portion 50 for at least a part of its length between the ends. In a preferred embodiment, the cord support 44 has a first rod 46, a second rod 48, and a coiled spring resilient section 50 joining the first and second rods 46 and 48. The first, and upper, rod 46 has at an upper end a helical bent portion 52. The helical bent portion 52 is formed to provide spaces in the helical bent portion 52 allow the electrical cord from the iron, not shown, to be placed in the spaces so that the cord is supported above the ironing surface 23 of the ironing board 22. The lower end of the first rod 46 is attached to the coiled spring resilient section 50. The second, and lower, rod 48 of the cord support 44 has an upper end 58 which detachably receives the coiled spring resilient section 50, as best seen in FIG. 2. The second rod 48 also has a "L" shaped bend defining the foot 60 at the lower end. The foot 60 is pivotably and slideably received by the opening 38 defined by the "U" shaped bend 36 of the brace 34. At the end of the foot 60, extending at an angle of approximately 90° from the foot 60, is a tab 62. The tab 62 is retained by the "L" shaped tab 40 of the brace 34, which acts as a detent, to hold the cord support 44 in a raised position, as shown in FIG. 1.

In a preferred embodiment, the detachable article holder 66 has a lower circular hoop 68 and a pair of support bars 70. The support bars 70 are secured to the lower circular hoop 68 and form chords of the circle defined by hoop 68, thereby defining a base for retaining an article such as a can of starch, a spray bottle, a beverage container, or a remote control. The article holder 66 also has an upper hoop 72. The upper hoop 72 has a circular portion for approximately 345° and each end of the circular portion of the upper hoop 72 has a tang 74 depending downward therefrom. The article holder 66 has four vertical supports 76 extending between the lower hoop 68 and upper hoop 72 for spacing the hoops 68 and 72 and defining the article holder 66. The vertical supports 76 can be located inside or outside the hoops 68 and 72, and cooperate with upper hoop 72 to provide lateral support for an article. The article holder 66 has a vertical support bar 84 extending between the tangs 74 of the upper hoop 72. A single tang could be integral with one of the vertical supports instead of the tangs integral with the upper hoop 72. The detachable article holder 66 could also be made of other materials such as molded plastic.

The clamp 12 has a second support for detachably mounting the article holder 66. In a preferred embodiment, the clamp 12 has a second brace 78. The second brace 78 has a pair of "U" shaped bends 80. The second brace 78 is spot welded to the base 14 of the clamp 12 such that the "U" shaped bends 80 each define an opening 82, as best seen in FIG. 2, for detachably receiving the tangs 74 of the upper hoop 72.

The apparatus 10 has an extension portion, such as an "L" shaped bracket 88, for mounting an female electrical outlet 96. The "L" shaped bracket 88 has a first leg 90 and a second leg 92. The first leg 90 is welded to the lower leg portion 18 of the clamp 12. The second leg 92 depends downward in the plane with the end portion 14 of the clamp 12. The second leg 92 has a threaded hole, not shown, which receives a screw 94. The apparatus 10 has an female electrical outlet 96 with an electrical cord 98 extending to a plug (not shown). The female electrical outlet 96 is secured to the second leg 92 by the screw 94 and can receive the plug from the iron. The electrical outlet 96 is shown below the article holder 66 in the Figures so that article placed in the article holder 66 will not interfere with the outlet 96. However, the outlet 96 could be place in other locations such to the side of the article holder 66, using the extension portion or directly to the underside of the lower leg 18 of the clamp 12.

Referring to FIG. 2, the apparatus 10 is shown removed from the ironing board 22. The coiled spring resilient section 50, which is attached to the first drive 46 of the cord support 44, is removed from the upper end 58 of the second rod 48. The second rod 48 is shown in phantom in a retracted position where the foot 60 has been slideably moved in the opening 38 defined by the "U" shaped bend 36 of the brace 34 such that the tab 62 is disengaged from the "L" shaped tab 40, and the foot 60 has been pivoted relative to the opening 38. The second rod 48 in the retracted position will lie against the ironing board 22 (not shown in FIG. 2), so that the ironing board 22 can be stored with the apparatus 10 still attached. The article holder 66 is removed from the second brace 78 by raising the article holder 66 vertically, thereby removing the tangs 74 from the openings 82.

The present invention may be embodied in other specific forms without departing from the spirit or essential attributes thereof and, accordingly, reference should be made to the appended claims, rather than to the foregoing specification, as indicating the scope of the invention.

I claim:

1. An apparatus mountable on an ironing board for supporting an electrical cord of an electrical iron and for retaining an article, comprising:

a clamp having an end portion, and upper and lower leg portions extending from the end portion and spaced from each other, the upper leg portion adaptable for engaging the ironing board, the lower leg portion having an ironing board engaging means;

a cord support having a cord receiving portion, a lower end, and a resilient spring section located between the cord receiving portion and the lower end;

a brace mounted to the upper leg portion of the clamp section, a "L" shaped tab on the brace, the brace and the upper leg portion of the clamp section defining an opening therebetween, the lower end of the cord support having a foot slideably and pivotably received by the opening and having a locking tab engageable by the "L" shaped tab for releasably retaining the cord support in a raised position and for releasing the lower end for permitting the cord support to be folded parallel to the ironing board; and the clamp having mounting means for detachably securing an article holder for accepting and holding the article.

2. An apparatus as in claim 1, wherein the mounting means is a mounting brace having a pair of openings and the article holder means has a pair of tangs detachably received by the openings in the mounting brace.

3. An apparatus as in claim 2, wherein the article holder has a lower hoop and an upper hoop, parallel to and spaced apart from each other, a plurality of vertical supports extending between the hoops, and at least one support bar spanning and secured to the lower hoop for retaining the article.

4. An apparatus as in claim 1, further comprising an electrical outlet carried by the clamp section for receiving a plug on the electrical cord of the iron.

5. An apparatus as in claim 1, wherein the end section of the clamp has the mounting means for the article holder, and the article holder projects from the end section away from the ironing board.

6. An apparatus mountable on an ironing board for supporting an electrical cord of an electrical iron and for retaining an article, comprising:

a clamp having an end portion, and upper and lower leg portions extending from the end portion and spaced from each other, the upper leg portion adaptable for engaging the ironing board, the lower leg portion having an ironing board engaging means;

a cord support having a cord receiving portion, a lower end, and a resilient spring section located between the cord receiving portion and the lower end;

the upper leg portion of the clamp including a retainer for slideably receiving the lower end of the cord support, the retainer having a detent thereon for engaging said lower end for releasably retaining the cord support in a raised position and for releasing said lower end for permitting the cord support to be folded parallel to the ironing board surface; and the clamp having a mounting brace having a pair of openings for detachably securing an article holder for accepting and holding the article and the article holder has a pair of tangs detachably received by the openings in the mounting brace.

7. An apparatus as in claim 6, wherein the article holder has a lower hoop and an upper hoop, parallel to and spaced apart from each other, a plurality of vertical supports extending between the hoops, and at least one support bar spanning and secured to the lower hoop for retaining the article.

8. An apparatus as in claim 6, further comprising an electrical outlet carried by the clamp for receiving a plug on the electrical cord of the electrical iron.

9. An apparatus mountable on an ironing board for supporting an electrical cord of an electrical iron and for retaining an article, comprising:

a "C" shaped clamp having an end portion, and upper and lower leg portions extending from the end portion and spaced from each other, the upper leg portion adaptable for engaging the ironing board, the lower leg portion having a threaded hole;

a threaded bolt received by the threaded hole which cooperates with the upper leg portion for engaging the opposite surfaces of the ironing board securing the apparatus to the ironing board;

a cord support having a first rod, a second rod, and a resilient spring section, the first rod having a cord receiving portion for receiving the cord of the iron and a lower end mounted to the resilient spring section, the second rod having an upper end for detachably receiving the resilient spring section and a lower end;

a brace mounted to the upper leg portion of the clamp, a "L" shaped tab on the brace, the brace and the upper leg portion of the clamp defining an opening, the lower end of the second rod has a foot slideably and pivotably received by the opening and a locking tab receivable by the "L" shaped tab for releasably retaining the cord support in a raised position and for releasing the lower end for permitting the cord support to be folded parallel to the ironing board;

the end portion of the clamp has a mounting means; and a holder means detachably mounted to the clamping means, the holder means adapted for accepting the article, such as a can.

10. An apparatus as in claim 9, further comprising a cap accepted by the threaded bolt and located between the leg portions of the clamp for engaging the ironing board for securing the apparatus to the ironing board;

the mounting means is a mounting brace mounted to the end portion of the clamp and having a pair of openings and the holder means has a pair of tangs detachably received by the openings in the mounting brace;

a "L" shaped bracket having a pair of leg portions, one of the leg portions mounted to the lower leg portion of the clamp, the other leg portion located below the end portion of the clamp; and an electrical outlet mounted on the other leg portion of the "L" shaped bracket adapted for receiving the plug of the iron.

11. An apparatus as in claim 9, further comprising an electrical outlet carried by the clamp for receiving a plug on the electrical cord of the electrical iron.

12. An apparatus is in claim 9, further comprising a cap accepted by the threaded bolt and the cap having a flat surface for engaging the ironing board.

13. An apparatus mountable on an ironing board for supporting an electrical cord of an electrical iron and for retaining an article, comprising:

a "C" shaped clamp having an end portion, and upper and lower leg portions extending from the end portion and spaced from each other, the upper leg portion adaptable for engaging the ironing board, the lower leg portion having a threaded hole;

a threaded bolt received by the threaded hole which cooperates with the upper leg portion for engaging the opposite surfaces of the ironing board securing the apparatus to the ironing board;

a cord support having a first rod, a second rod, and a resilient spring section, the first rod having a cord receiving portion for receiving the cord of the iron and a lower end mounted to the resilient spring section, the second rod having an upper end for detachably receiving the resilient spring section and a lower end;

the upper leg portion of the clamp including a retainer for slideably receiving the lower end of the cord support, the retainer having a detent thereon for engaging the lower end of the second rod for releasably retaining the cord support in a raised position;

the end portion of the clamp has a mounting brace having a pair of openings: and holder means having a pair of tangs detachably received by the openings in the mounting brace for detachably mounting to the clamping means, the holder means adapted for accepting the article, such as a can.

14. An apparatus as in claim 13, wherein the holder means has a lower hoop and an upper hoop, parallel to and spaced apart from each other, a plurality of vertical supports extending between the hoops, and at least one support bar spanning and secured to the lower hoop for retaining the article.

* * * * *